US006970242B2

(12) United States Patent  (10) Patent No.: US 6,970,242 B2
Puppels  (45) Date of Patent: Nov. 29, 2005

(54) OPTICAL SPECTROMETER

(75) Inventor: Gerwin Jan Puppels, Rotterdam (NL)

(73) Assignee: River Diagnostics B.V., Rotterdam (NL)

( * ) Notice: Subject to any disclaimer, the term of this patent is extended or adjusted under 35 U.S.C. 154(b) by 0 days.

(21) Appl. No.: 11/034,229

(22) Filed: Jan. 12, 2005

(65) Prior Publication Data

US 2005/0179895 A1    Aug. 18, 2005

Related U.S. Application Data

(63) Continuation of application No. PCT/NL02/00468, filed on Jul. 12, 2002.

(51) Int. Cl.[7] .............................. G01J 3/18; G01J 3/447
(52) U.S. Cl. ...................................... 356/328; 356/327
(58) Field of Search ............................... 356/326, 327, 356/328, 332, 334

(56) References Cited

U.S. PATENT DOCUMENTS 5,835,210 A    11/1998  Ershov
5,886,785 A    3/1999   Lefevre
5,946,128 A    8/1999   Paek
2001/0030745 A1  10/2001  He et al.

FOREIGN PATENT DOCUMENTS

WO      WO 99/13543         3/1999
WO      WO 2004-008089 A1   1/2004

OTHER PUBLICATIONS

PCT International Search Report, PCT/NL02/00468, dated Mar. 2, 2003.

*Primary Examiner*—F. L. Evans
(74) *Attorney, Agent, or Firm*—TraskBritt (57) ABSTRACT

Incoming light is spectrally analyzed by diffracting the incoming light with a grating. At least a part of the incoming light is split off so that this part contains mainly one polarization component of the incoming light. It is ensured that this split-off part and a remaining part of the incoming light reach the grating with their polarized component mainly parallel to a main direction of polarization which is diffracted with maximal efficiency by the grating. For this purpose, at least the split-off part is diffracted after being passed through a polarization rotating element.

15 Claims, 10 Drawing Sheets

OPTICAL SPECTROMETER

CROSS-REFERENCE TO RELATED APPLICATION

This application is a continuation of PCT International Patent Application No. PCT/NL2002/000468, filed Jul. 12, 2002, designating the United States of America, and published, in English, as PCT International Publication No. WO 2204/008089 A1 on Jan. 22, 2004, the contents of the entirety of which is incorporated by this reference.

TECHNICAL FIELD

The invention relates to an optical spectrometer.

BACKGROUND

A well-known type of optical spectrometer uses a grating to diffract light. A grating is, for example, an array of fine, substantially parallel, substantially equally spaced grooves ("lines" or "rulings") on a reflecting or transparent substrate. The grooves result in diffractive mutual interference effects that concentrate reflected or transmitted electromagnetic energy in discrete directions for which constructive interference occurs. These directions are wavelength dependent, except for the direction of straight transmission or reflection (angle of incidence=angle of reflection), which is not considered to be included in the definition of "diffraction" as used herein. In a spectrometer, the resulting wavelength-dependent dispersion is used to analyze the spectral properties of the light. An intensity-detection device (e.g., a photo-detector) measures the intensity of the light as a function of angle of diffraction.

For applications where a sensitive measurement of the spectral properties of weak incident light is required, it is desirable that such a spectrometer has a high-diffraction efficiency for the diffraction order or orders that are used. Such a desire exists, for example, for applications like Raman Spectroscopy, in which the spectrum has to be analyzed of generally low-intensity light that has been inelastically scattered by an object under investigation.

Unfortunately, under certain circumstances, the efficiency of diffraction from a grating is not very high, or only high for one polarization direction of the incident light, which can be the case, e.g., for gratings used under grazing incidence in which such effects already become noticeable when the angle between the direction of the incoming light and the normal of the plane of the grating surface increases to values above 60 degrees. Usually, different polarizations of light are also diffracted optimally in different wavelength regions.

SUMMARY OF THE INVENTION

Among others exemplary embodiments, the invention provides an increase in the efficiency of a grating spectrometer.

In another exemplary embodiment, the invention provides an increase in the efficiency when light is incident on the grating under a grazing angle of incidence.

Among other exemplary embodiments, the invention increases the information that can be obtained from diffraction by a grating.

The invention provides for a spectrometer according to claim 1. Efficiency of diffraction from a grating may be different for different polarization directions of the incident light. As a result, the grating has a main direction along which light must be polarized to realize diffraction maximum efficiency. For instance, for holographic gratings with a substantially sinusoidal groove profile, the diffraction efficiency for light polarized with its electric field vector perpendicular to the direction of the grooves of the grating (TM-polarized light), when incident under a large angle with the normal to the grating surface (grazing incidence), can be very high (e.g., >90%) in certain wavelength intervals, whereas under such circumstances, diffraction efficiency for incident light with an electric field component parallel to the direction of the grooves of the grating (TE-polarized light) can be very poor (e.g., <15%). Thus, in this case, the main direction is the direction wherein the electric field vector is perpendicular to the direction of the grooves of the grating.

The invention also provides for splitting off at least a part of the incoming light from a remaining part of the incoming light so that a first polarization component of the incoming light is split off with higher efficiency than a second polarization component of the incoming light. The split-off part is fed to the grating so that a direction of the first polarization component in the split-off part is in parallel with the main direction of the grating at least once when the split-off part is diffracted by the grating. A remaining part of the incoming light is fed to the grating so that a direction of the second polarization component in the remaining part is in parallel with the main direction at least once when the remaining part is diffracted by the grating. It should be understood that the term "remaining part," as used herein, refers to the fact that the split-off part and the remaining part together constitute at least part of the incoming light. The term does not require that the remaining part travels separately from the split-off part anywhere in the spectrometer.

Thus, when the split-off part and the remaining part are diffracted, they are both more polarized along the main direction than the incoming light. As a result, the overall efficiency of diffraction of the incoming light is increased. This is, for example, the case when the incoming light is unpolarized. The efficiency of diffraction of incoming light that is polarized may be increased in this way when the polarized light is received with non-optimal polarization.

It has moreover been discovered that to achieve a high, uniform and reproducible spectral resolution over the wavelength interval of interest, it is desirable that the diffracted light should preferably be diffracted substantially perpendicular to the plane of the grating. Resolution depends on the cosine of the angle between the direction of diffraction and the normal to the plane of the grating. When the light in the wavelength interval of interest is diffracted in a range of directions for which the change in the cosine of this angle is minimal, the wavelength dependence of the spectral resolution is minimized. Moreover, for a given angle of incidence of incoming light on the grating, resolution is then at a maximum. Rotation of the direction of polarization so that both polarization components reach the grating at least once with their polarization direction mostly parallel to the main direction is especially advantageous in this case, since diffraction in the perpendicular direction requires incidence under an angle, which would otherwise lower efficiency.

Furthermore, in order to achieve high efficiency, it is desirable that only one order of wavelength-dependent diffraction occurs. Thus, no energy is lost to orders of diffraction that do not reach the intensity-detection device; or if it did, that would have to be analyzed separately. To realize this in combination with diffraction close to the normal to the grating plane, the incoming light has to be incident at a relatively small angle relative to the plane of the grating, which will be termed a "grazing angle," which is typically in the range of 60–85 degrees with respect to the normal of the plane of the grating, depending on the wavelength range of interest. At larger angles, an impractically large grating and lens for collection of diffracted light are needed. For smaller angles, the direction of first-order diffracted light in the wavelength range for which no second-order diffraction can occur, deviates from perpendicular diffraction as described above to the extent that the advantage of substantially wavelength-independent spectral resolution as a function of wavelength obtained with substantially perpendicular diffraction is lost.

Measures to improve alignment of polarization components in the incoming light to the main direction of the grating are especially advantageous in this case, since diffraction in the perpendicular direction in combination with grazing incidence otherwise lowers diffraction efficiency of commonly used gratings, such as, e.g., holographic gratings.

The use of grazing incidence has the effect that the area of the grating that is illuminated with the incoming light is larger than the required area of the optical elements in the path of the incoming light before the light reaches the grating (since these elements are generally perpendicular to the direction of travel of the light). This means that relatively small, low-cost optical elements can be used in that path. This holds, in particular, for the polarization rotation element that is used to orient the polarization direction of both polarization components in parallel with the main direction of the grating. But it holds more generally for any optical element that is used in the incoming path under grazing incidence, not only when the polarizations are both oriented in the main direction.

Conventional imaging elements (e.g., lenses or curved mirrors) are used in a spectrometer optically in front of the grating and behind it, so that the entry opening of the spectrometer is focused onto the detector. (In the context of this invention, the entry opening of the spectrometer refers to the point through which the light to be analyzed by means of the spectrometer enters the spectrometer including, but not limited to, a pinhole, a diaphragm, a slit, an optical fiber, an optical waveguide, or a combination of one or more of such elements.) When the incoming light reaches the grating under a grazing angle of incidence, a relatively small collimating optical element of relatively shorter focal length can be used in front of the grating (imaging prior to diffraction) and a relatively larger optical element of relatively larger focal length is preferably used behind the grating (image after diffraction). Thus, signal detection efficiency is optimized and a demagnification is realized in the image of the entry opening onto the detector in the direction of wavelength dispersion, which increases spectral resolution at the detector.

Preferably, the spectrometer contains first and second light paths between the entry opening of the spectrometer and the grating, a first component of the incoming light reaching the grating substantially only through the first light path, a second component of the incoming light reaching the grating via the second light path, the spectrometer containing a polarization rotation element in the second light path arranged to rotate the polarization direction(s) of the second component so that it reaches the grating substantially optimally polarized in the main direction. The first component, when it is already mainly directed in the main direction, may reach the grating unrotated. This makes it possible to realize the spectrometer with a small number of components. In a further embodiment, the second light path contains the first light path. The second light path furthermore contains a path of specular reflection of light from the first light path from the grating, a reflecting element for reflecting the specularly reflected light back onto the grating, and a polarization rotation element for substantially orthogonally rotating the polarization of the specularly reflected light in the second light path. In this way, the polarization selective effect of specular reflection from the grating is used to extract the second polarization component for rotation of its polarization (although the specularly reflected light is not usually fully polarized, it is usually more polarized than the incoming light). Any wavelength-dependent variation of the main direction is thus automatically accounted for.

In another embodiment, the orthogonal polarization components of the light to be analyzed are separated before diffraction by the grating in the path between the entry opening of the spectrometer and the grating. The paths followed by the two polarization components to the grating after separation differ with respect to one another in the amount of rotation of their respective polarization so that both polarization components reach the grating polarized in the main direction. Thus, the two components reach the grating from substantially the same direction, which causes the wavelength-dependent direction of first-order diffraction to be substantially the same for both components.

The spectrometer images the diffracted light onto the detector. In one embodiment the first and second light paths are configured so that the spectrometer images each wavelength component of the first polarization component of the incoming light onto the detector at substantially the same positions where the spectrometer images the corresponding wavelength components of the second polarization component of the incoming light. In this way, a spectrometer with high efficiency is obtained.

In another embodiment, the light paths are configured so that after diffraction from the grating, the spectrometer images the wavelength components of the first polarization component of the incoming light onto the detector at a series of positions that is detectably different from further positions where the spectrometer images the wavelength components of the second component. Thus, it is possible to analyze two spectra, each for a respective one of the polarization components using a single diffraction experiment with a single grating. A two-dimensional array of detector elements, such as a CCD, may be used to measure the intensity of the diffracted light of the two polarization components of various wavelengths. Instead, a pair of linear detectors may be used, each for measuring the intensity of the diffracted light of one of the polarization components as a function of wavelength.

When the light that is directly reflected from the grating is reflected back onto the grating along the direction in which it is reflected from the grating, the spectra of the two polarization components are imaged with their spatial wavelength dependence running in mutually opposite direction at the detector. Therefore, the two spectra are preferably imaged at spatially different positions on the detector. In another embodiment, the directly reflected light is passed through a path that directs this light onto the grating from substantially the same direction as the originally incident light. Thus, diffracted light of both polarization components have the same type of spatial wavelength dependence at the detector.

In a further embodiment, the spectrometer contains a polarization filter between the grating and the detector, directed to block out any light that has been diffracted with a direction of polarization perpendicular to the main direction. Thus, it is ensured that a particular detector element receives light substantially only with polarization parallel to the main direction.

Preferably, light from the entry opening of the spectrometer reaches the grating at an angle selected so that first-order diffraction occurs in a direction substantially perpendicular or at least close to perpendicular to the plane of the grating for a wavelength range of interest. As a result, a maximum resolution is realized and resolution depends minimally on wavelength. It will be appreciated that this effect is achieved even if the polarization components of the light from the entry opening of the spectrometer are not rotated in order for both to be directed parallel to the lines of the grating. However, such a rotation of the angle of polarization is particularly useful in the case of a perpendicular angle of diffraction because in the latter case, efficiency would decrease when no measures are taken to ensure efficient diffraction of both polarization components. This is even more the case when the grating period and angle of incidence are selected so that substantially only first-order diffraction from the grating is possible and occurs substantially perpendicular to the plane of the grating in order to increase efficiency. This measure too can be applied even if the two polarization components are not rotated in order for the electric field vector of both to be directed perpendicular to the lines of the grating when they are diffracted by the grating. But in the latter case, efficiency is increased.

DESCRIPTION OF THE DRAWINGS

These and other advantageous aspects of the spectrometer and method of measuring will be described in more detail using the following figures.

DETAILED DESCRIPTION OF THE INVENTION

Figure 1:
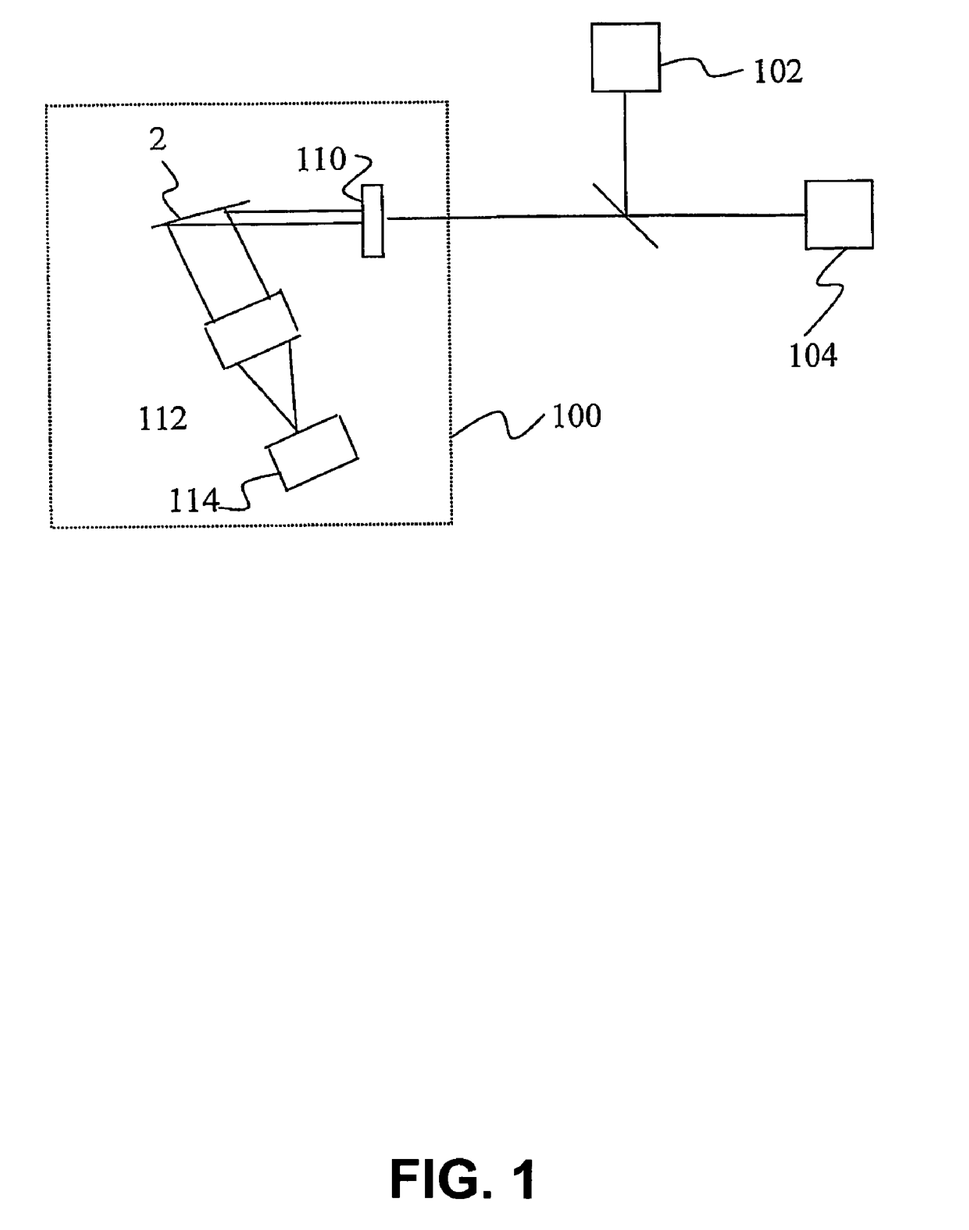
FIG. 1 shows a spectrometer.

FIG. 1 schematically shows a spectrometer 100. Spectrometer 100 contains entrance optics 110, a grating 2, detection optics 112 and a detector 114. Spectrometer 100 serves to measure the intensity of light as a function of wavelength. An example of an application of such a spectrometer 100 is in Raman scattering experiments where the wavelength dependence of intensity of inelastically scattered light (scattered light with wavelengths other than the light incident on a specimen) is measured. By way of example, FIG. 1 schematically shows a Raman measurement configuration with a preferably monochromatic light source 102 and a specimen 104. In operation, light source 102 produces light to illuminate specimen 104, which scatters the light. The scattered light is fed to spectrometer 100, which measures the intensity of the scattered light as a function of wavelength (or, equivalently, frequency).

Figure 1A:
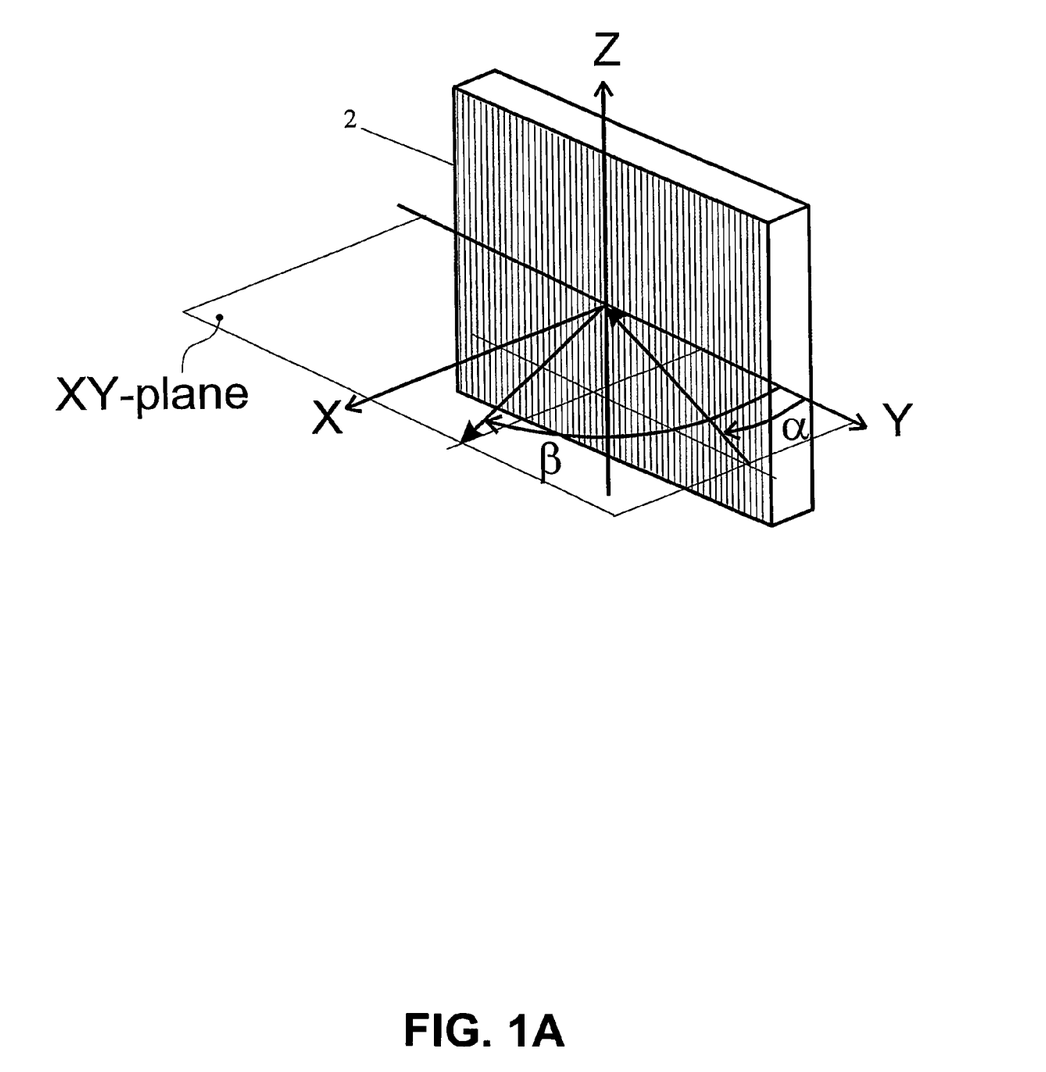
FIG. 1A shows a grating and a coordinate system.

FIG. 1A shows a reflection grating 2 for use in a spectrometer. The grating has a succession of grooves that run in parallel with one another. Although the diffractive structure of grating 2 will be referred to generally as "grooves" or "lines," these terms should be understood to include any type of structure with spatially periodic diffractive properties. Constructive interference of light from diffracted light from different grooves leads to wavelength-dependent diffraction from the grooves at certain angles.

A coordinate system has been defined relative to grating 2 for the purpose of description of the invention. The center of the coordinate system is at the center of the front surface of the grating used in the spectrometer. The X-axis passes through the center of the coordinate system and is orthogonal to the grating surface. The Y-axis passes through the center of the coordinate system and is orthogonal to the X-axis and orthogonal to the direction of the grooves of the grating. The Z-axis passes through the center of the coordinate system and is orthogonal to both the X-axis and the Y-axis and, therefore, parallel to the direction of the grooves of the grating.

An angle $\alpha$ is defined as the angle included by the positive Y-axis and a beam of light with a vector of incidence in the XY-plane traveling towards the grating surface. For the case of a reflection grating, an angle $\beta_{\lambda,1}$ is defined as the angle between the positive Y-axis and the beam of light of wavelength $\lambda$ diffracted by the grating in first order.

Diffraction in nth-order diffraction of light fulfills the equation (Equation 1):

$$n\lambda = d \cdot (\cos \alpha + \cos \beta_\lambda)$$

with:
n=the order of diffraction
$\lambda$=wavelength of diffracted light
d=grating constant (distance between successive grooves in the grating)
$\alpha$=as defined above
$\beta_{\lambda,n}$=angle of nth order diffraction of light with wavelength $\lambda$ In the context of this invention, first-order diffraction is defined by means of Equation 1 as diffraction for which the integer n takes the value 1. (When n=0, specular reflection occurs, which will not be termed "diffraction" in the present context.)

Figure 2A:
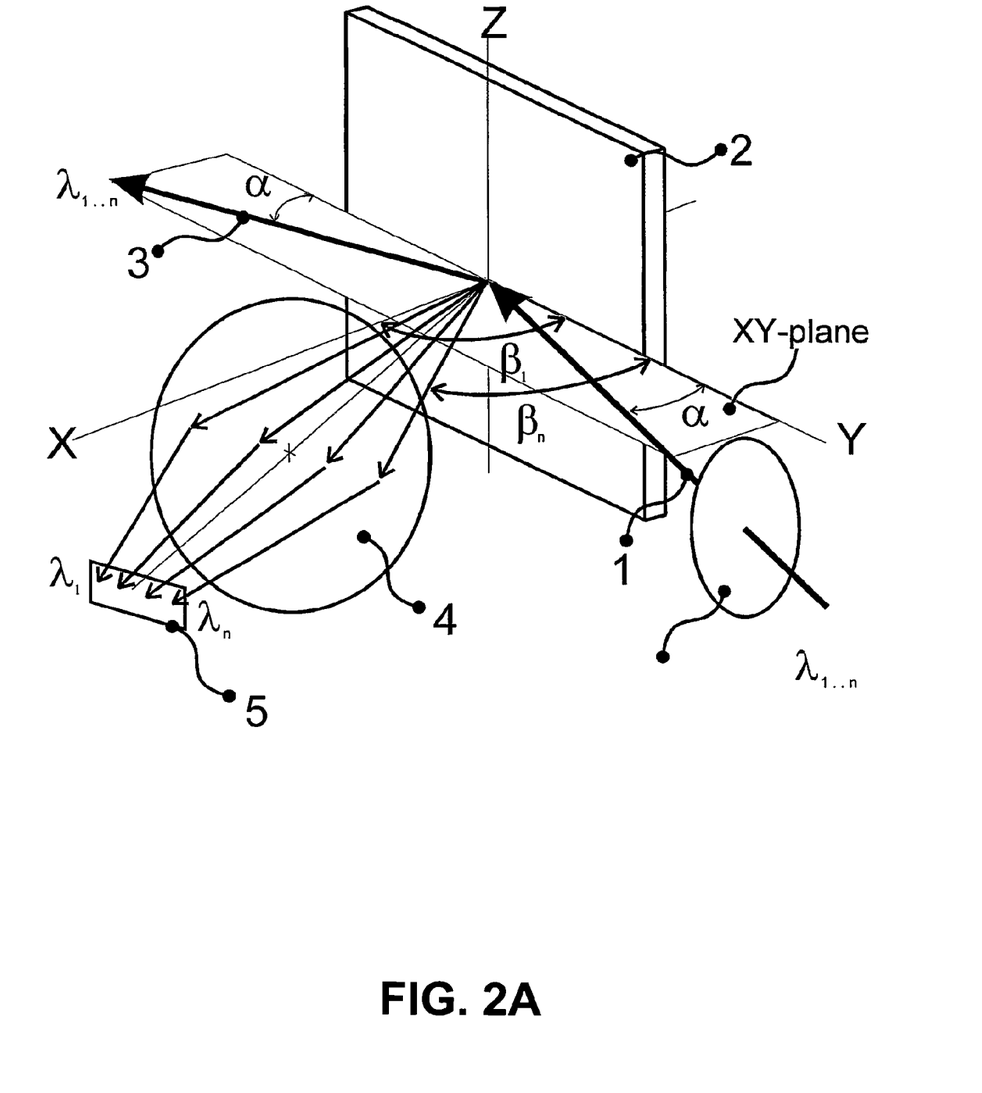
FIG. 2A shows light beams involved in dispersion by a grating.

FIG. 2A shows a beam of light 1 containing components with a number of wavelengths of interest $\lambda$, incident on a plane reflection grating 2 with grooves parallel to the Z-axis of the coordinate system. Beam 1 lies in the XY-plane of the coordinate system and makes an angle $\alpha$ with the grating plane. Beam 3 is the light that is specularly reflected by grating 2. Proper choice of the grating constant d and the angle of incidence $\alpha$ of beam 1 furthermore only allows for diffraction of light in first order. This is the case when the following conditions are fulfilled for the wavelengths of interest:

$2\lambda/d - \cos \alpha > 1$ (no diffraction possible for $n > 1$) and $\lambda/d + \cos \alpha > 1$ (no diffraction possible for $n < 0$)

The practical implication of these conditions is that for a planar reflection grating, first-order diffraction for the wavelengths of interest will occur at angles $\beta_\lambda$, smaller than 90° as illustrated in FIG. 2A.

Under such circumstances, when the angle $\alpha$ becomes small, the first-order diffraction efficiency for TM-polarized light can become very high (>90%), with proper choice of groove profile and grating coating as can be calculated by means of commercially available dedicated software packages such as the pCgrate-software available from IIC, Inc. (Penfield, N.Y.). In contrast, incident TE-polarized light may be very poorly diffracted in first order and consequently be concentrated in the specularly reflected light (i.e., in beam 3).

A lens 4 in detection optics 112 may be used to focus the wavelengths of interest, diffracted in first order, onto a (multi-channel) light-sensitive device 5 in detector 114, e.g., a photodiode array or a charge-coupled device.

Light enters spectrometer 100 through an entry opening. Preferably, entrance optics 110 contain a narrow entry opening, such as a pinhole, slit, etc., and entrance optics 110 and detection optics 112 together image this entry opening onto detector 114 via grating 2. Preferably, light from the entry opening is focused onto detector 114 in a way in which the light is collimated at grating 2. This facilitates easy insertion of optical elements between entrance optics 110 and detection optics 112, without introduction of potential optical aberrations that would necessitate extra measures to prevent reduced performance of the spectrometer, e.g., with respect to spectral resolution or signal throughput. Of course, spectrometer 100 will also work when the light is not fully collimated at grating 2.

Preferably, therefore, the entrance optics 110 contain an optical element that collimates the light passed through the entry opening. This opening may be, e.g., a pinhole, a diaphragm, a slit or through an optical fiber or multiple optical fibers. It is well known that for a dispersive spectrometer such as the type described in this invention, the diameter of the pinhole, the diaphragm, or of the core of the optical fiber(s), or the width of the slit are directly related to the spectral resolution of the spectrometer. In the case where the light to be analyzed enters the spectrometer through a small pinhole or a small optical fiber, $D_{beam}$, the width of the collimated beam of light that is incident on the grating, is determined by the solid angle under which the light to be analyzed enters the spectrometer and the focal length of the optical element that collimates this light.

Figure 2B:
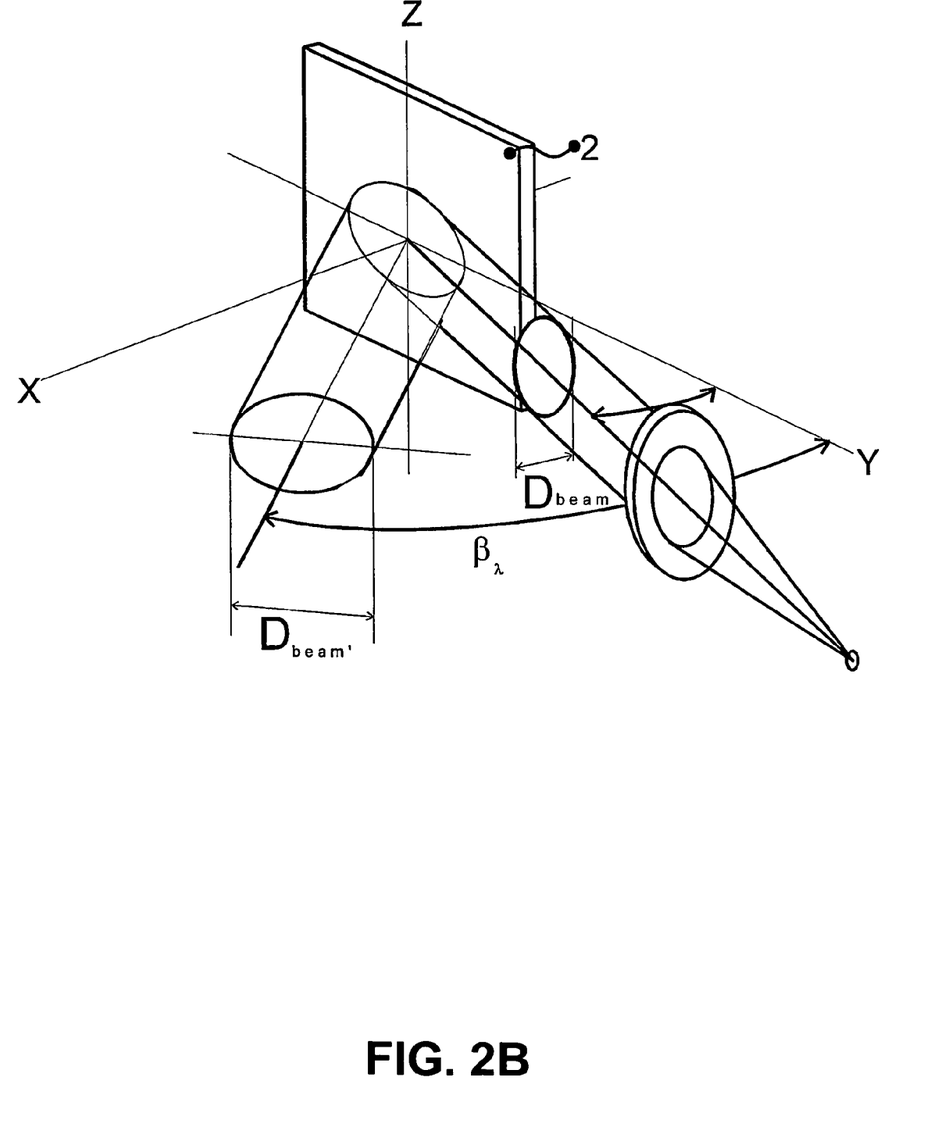
FIG. 2B illustrates beam widths.

A significant magnification M of the width of the first-order diffracted beam (in the direction perpendicular to the Z-axis) occurs, given by Equation 2.

$$M = D_{beam}/D_{beam} = \sin \beta_\lambda / \sin \alpha$$

in which
$D_{beam}$=diameter (in XY-plane) of first-order diffracted beam at wavelength $\lambda$
$D_{beam}$=diameter of incoming beam The width of the grating 2 (Y-dimension) must be larger than $D_{beam}/\sin \alpha$ in order to completely accommodate the incoming beam 1. The dimensions of lens 4 in detection optics 112 must be chosen accordingly to ensure efficient detection of first-order diffracted light.

An advantageous aspect of the beam magnification M is that the image of the pinhole or fiber core, or other means through which light enters the spectrometer, is demagnified in the direction of wavelength dispersion on detector 5 by the same factor M (not taking lens aberrations into account), thereby enhancing spectral resolution.

Figure 3:
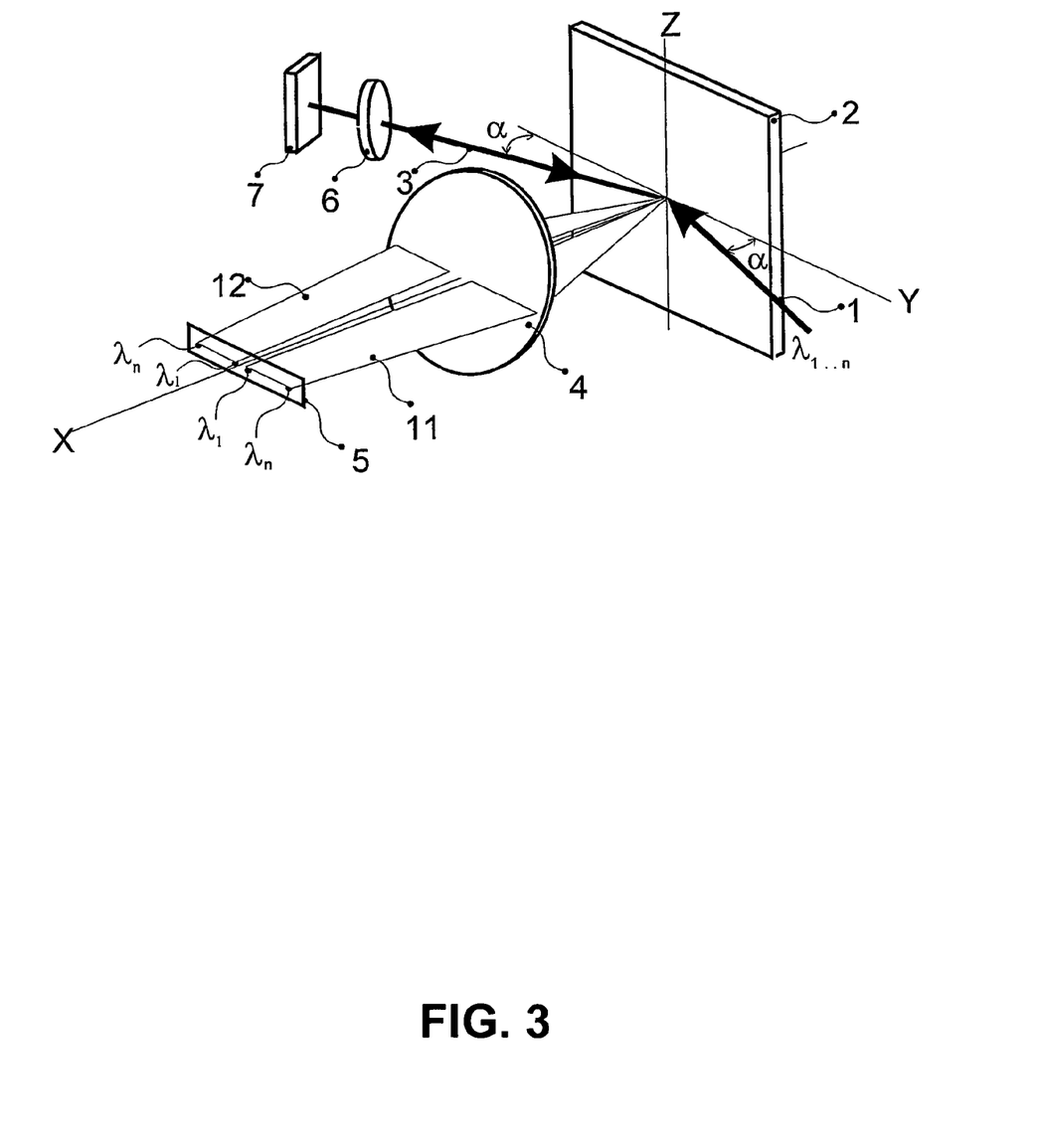
FIGS. 3 through 6 show dispersion of beams with different polarizations.

FIG. 3 shows a spectrometer in which a polarization rotation element 6 and a mirror have been added in the path of specular reflection from grating 2. The polarization rotation element is designed to rotate the polarization of light that passes through it back and forth over a total of 90 degrees. A $\lambda/4$ (also known as a quarter-wave phase retardation) plate may be used as a polarization rotating element, for example. In operation, the incident light 1 that is specularly reflected by grating 2 (beam 3) is passed through a $\lambda/4$ plate 6, which converts the light into circularly polarized light. The light is then reflected back by mirror 7, after which it again passes through $\lambda/4$ plate 6. Passing the specularly reflected light two times through $\lambda/4$ plate 6 has the effect of rotating the polarization of the light by 90°. This means that the light that was originally TE-polarized and was poorly diffracted in first order is now incident on the grating again with TM-polarization and is efficiently diffracted in first order by grating 2. Lens 4 collects both first-order diffracted light that has been diffracted directly and light that has been diffracted in first order after being reflected by mirror 7 and passed through polarization rotating element 6. Lens 4 focuses the wavelengths of interest on detector 5.

In the configuration of FIG. 3, light that is first specularly reflected and then back-projected onto grating 2 is focused on detector 5 at another position than the light 1 that is directly diffracted in first order. This implies that a sufficiently large detector is needed to collect all first-order diffracted light to detect light from the two spectra that are projected onto it side by side.

Figure 4:
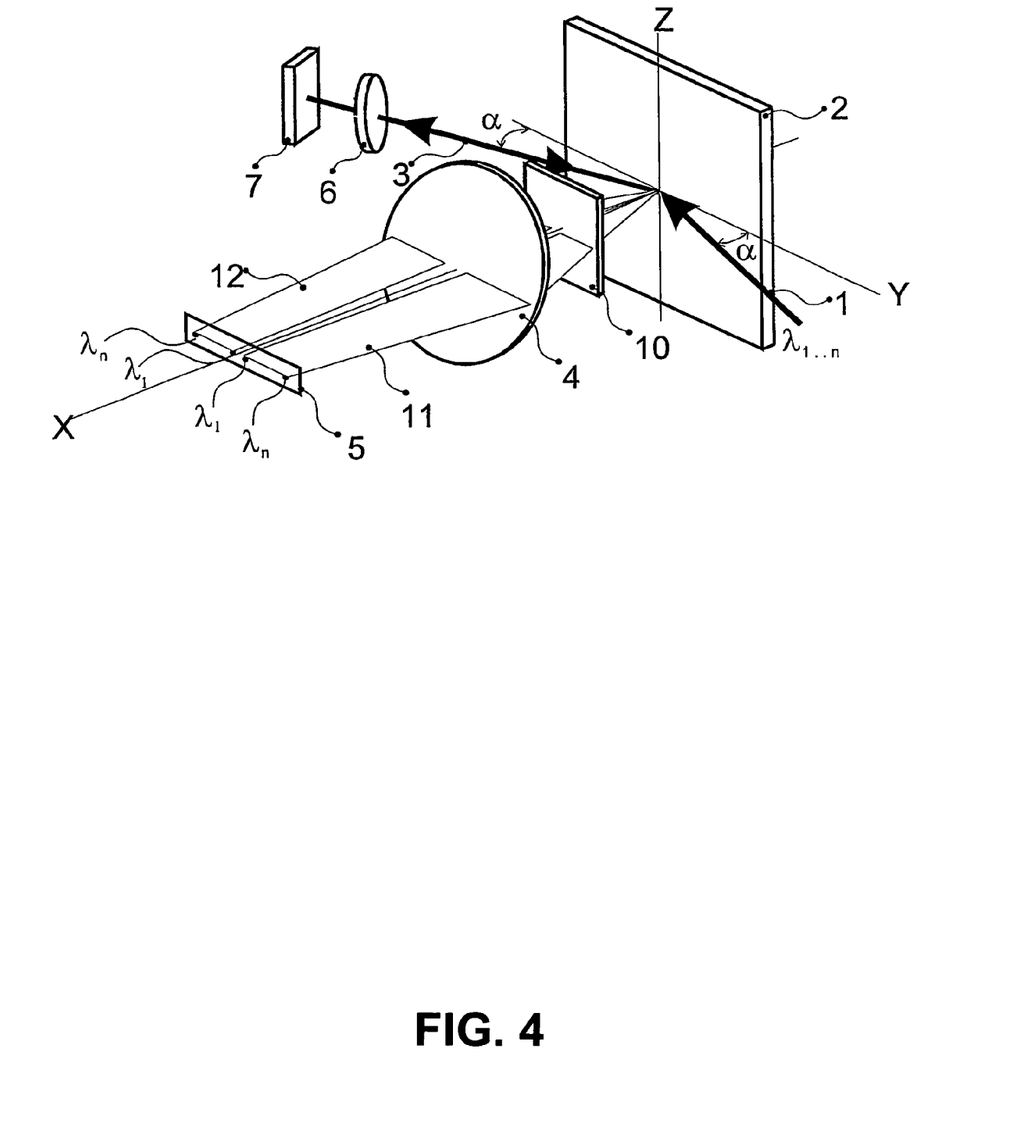

FIG. 4 shows a spectrometer with a linear polarizer 10 added in the light path of first-order reflections. Polarizer 10 transmits light that is TM-polarized in the path of the first-order diffracted light and blocks out light polarized perpendicular to this direction.

In operation, only diffracted light with TM-polarization is detected. First-order diffracted light 11 imaged onto the detector 5 provides the spectrum of the fraction of the incident light 1 with TM-polarization. First-order diffracted light 12 imaged onto detector 5 provides the spectrum of the TE-polarized fraction of the incident light 1.

Dependent on the wavelengths that occur in the incoming light, overlap may occur between the two spectra on the detector in the spectral regions outside the spectral region of interest. If light may be present in beam 1 outside the spectral region of interest, one or more filters are preferably added to the spectrometer, preferably in the entrance optics 110. The filter passes light in the wavelength region of interest but blocks light at wavelengths that could lead to a disturbing spectral overlap prior to incidence on the detector. Such limitation of incident light to block out all disturbing wavelengths except the spectral region of interest can be achieved, for example, by means of a dielectric broad-band pass filter known, per se, or by other means. The filter is placed preferentially in the path of the collimated beam.

However, several alternatives exist to avoid spectral overlap between the two spectra of the directly reflected light and the light whose polarization has been rotated. For example, the incident beam 1 of FIG. 3 may directed at grating 2 so that beam 1 makes a small angle $\gamma$ with the XY-plane (see FIG. 5).

Figure 5:
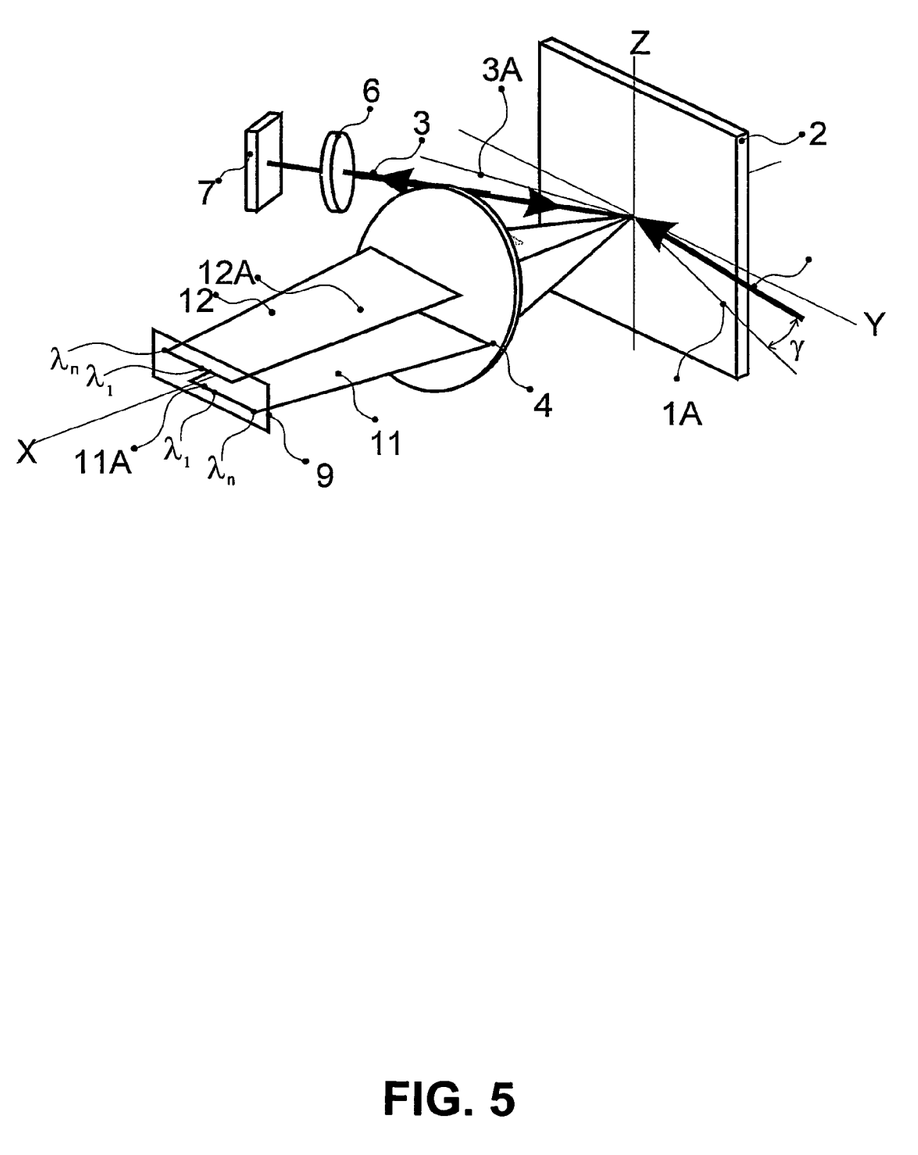

FIG. 5 depicts the case where the incident beam 1 makes an angle $\gamma$ with the XY-plane. The optical axis centers of lens 4 and the center of detector 5 still lie in the XY-plane. In this case, the incident light 1 and the diffracted light no longer have a polarization component that is exactly parallel to the groove direction of the grating. However, for small angles $\alpha$, the diffraction properties of the grating will not be significantly affected. TM-polarized light (with the electric field vector perpendicular to the grooves of the grating) will still be efficiently diffracted in first order and TE-polarized light (perpendicular to the TM-polarized component), poorly. In the situation depicted in FIG. 5, the incident light reaches the grating from above the XY-plane. Therefore, the TM-polarized fraction of the incident light, which is directly diffracted in first order, is focused on the lower half of detector 5. Light that is reflected specularly, primarily TE-polarized light, is reflected back by mirror 7. In this way, it passes the $\lambda/4$ plate 6 twice, which has the effect of rotating the polarization of the light by 90°. Light that is reflected back by mirror 7 and which is efficiently diffracted in first order by grating 2 is now focused on the top half of the detector 5. For detector 5, a two-dimensional array of light-sensitive elements, such as, e.g., a charge-coupled device, may be used. With such a detector, the detector element rows on which the two spectra are imaged can be separately read out, thus avoiding problems with spectral overlap.

The embodiment with a mirror 7 that reflects light with the TE-polarization component back to grating 2 along the same path via which it was reflected from grating 2 has the advantage that a symmetric configuration is realized with a minimum of components. However, the invention is not limited to this embodiment.

Figure 6:
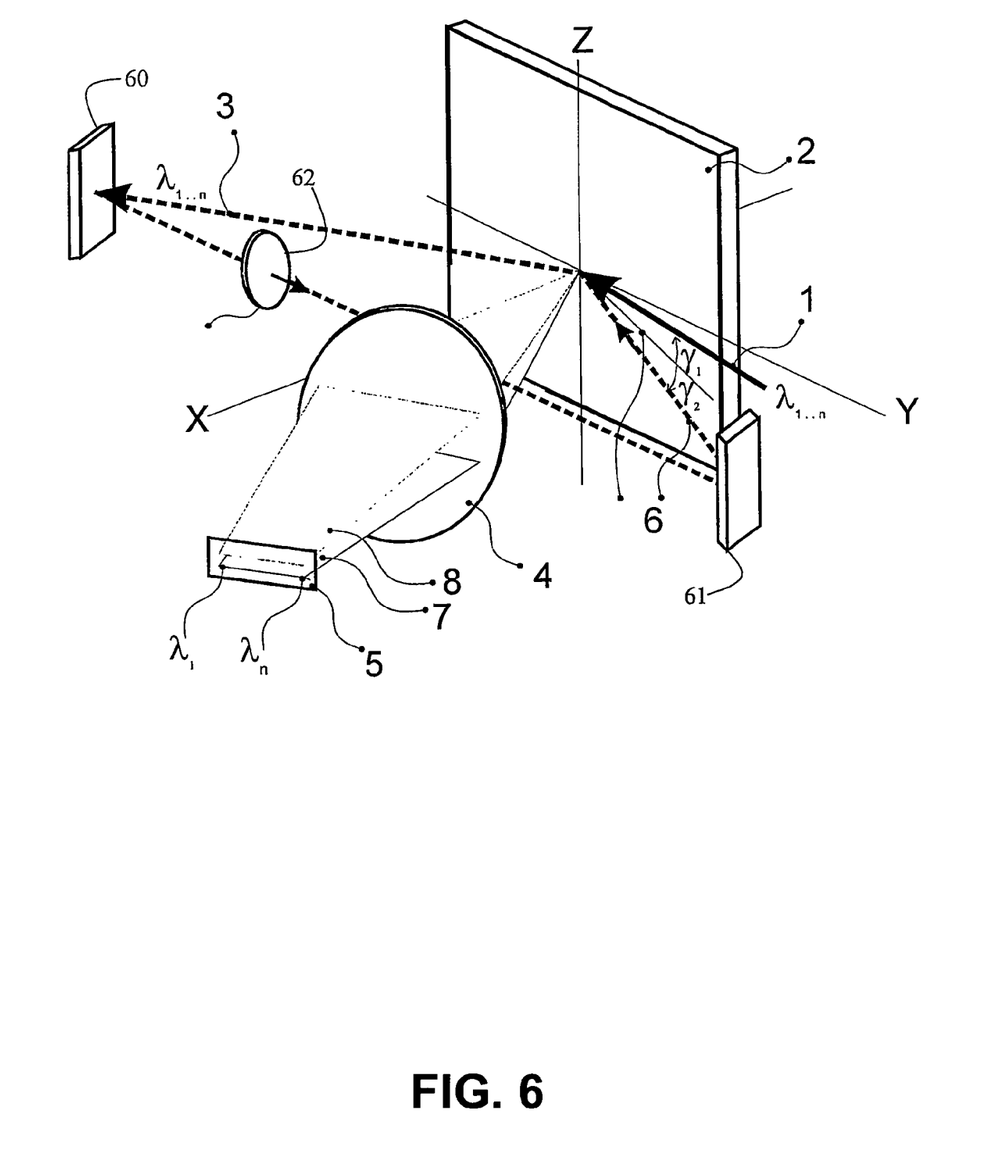

FIG. 6 shows a configuration with a pair of mirrors 60, 61 and a $\lambda/2$ plate 62 that serves to rotate the light that passes through it by 90 degrees. A first mirror 60 reflects the light that has been specularly reflected from grating 2 to second mirror 61, through $\lambda/2$ plate 62. Second mirror 61 is positioned under or above the incident beam of light 6. Half-wave phase plate 62 rotates the polarization of the light by 90°. Second mirror 61 reflects the light onto grating 2 under an angle $\gamma_2$ with the XY-plane. Angle $\gamma_2$ is different from the angle $\gamma_1$ between the incident beam of light and the XY-plane. The result is that light, which is directly diffracted in first order, is focused on a different position on detector 114 than light which is diffracted in first order after being reflected onto grating 2 via mirrors 60, 61, as shown in FIG. 6. The advantages of this configuration are that spectral overlap between the two spectra is avoided and that the dimensions of lens 4 and detector 114 can be much reduced when compared to the configuration of FIG. 3. This leads to a significant reduction in cost.

Various other well-known devices for rotating the polarization of light can be used instead of a phase retardation plate. These include, but are not limited to, the use of an assembly of multiple reflective surfaces by which the polarization direction is rotated.

In the configurations shown in FIGS. 2 to 6, the grating itself serves to separate the incident light into primarily TM-polarized light and primarily TE-polarized light. However, an additional polarization splitter may be used to perform separation of the polarization components.

Figure 7:
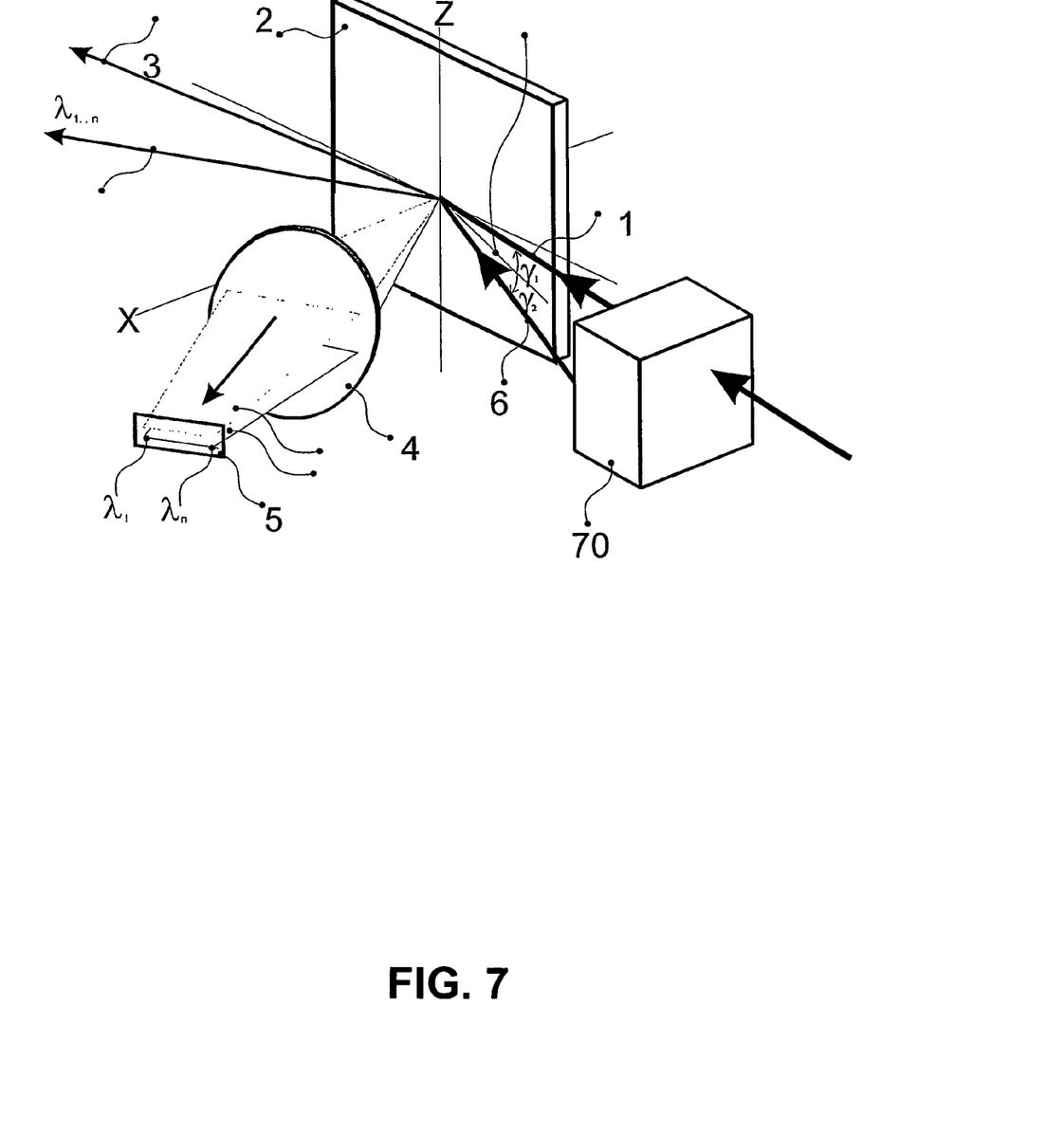
FIG. 7 shows another configuration of the spectrometer.

FIG. 7 shows an alternative approach. In this approach, a separator 70 separates the incident beam of light into two beams, a beam with TM-polarized light and a beam with TE-polarized light. The polarization of the second beam is rotated by separator 70 prior to guiding the light on grating 2.

Figure 8:
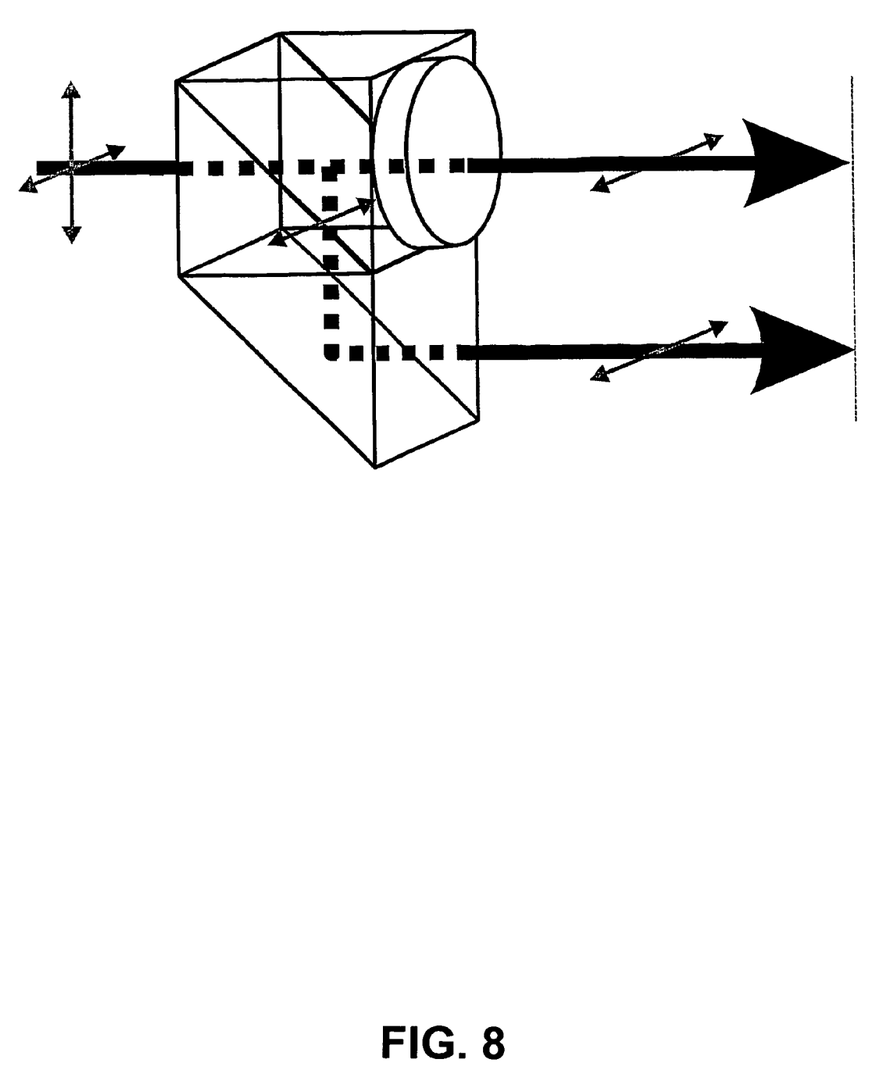
FIG. 8 shows a beam splitting and polarization rotation element.

FIG. 8 shows an achromatic polarizing beam splitter that may be used to split the polarization components and rotate the polarization. Separated beams with mutually orthogonal polarizations are directed towards grating 2 (not shown). The polarization of the beam containing TE-polarized light is rotated by 90°, by means of a half-wave phase retardation plate. The splitter of FIG. 8 is merely shown by way of example. Any known method may be used to achieve this polarization separation.

In the embodiment of the spectrometer of FIG. 7, both beams are directed to be incident onto grating 2 with the same angle (parallel beams). As a result, the different wavelength components resulting from first-order diffraction of the light in both beams by the grating will be focused at the same location of detector 114 by lens 4. This option is useful if the incident beam of light is unpolarized or if the polarization information contained in the light entering the spectrometer is not required.

In another embodiment, the beams are directed to be incident onto grating 2 at mutually different angles (not parallel to each other). As a result, first-order diffracted light from the two beams will be focused onto the detector at spatially separated positions. This option is useful if the information about the polarization state of the detected signal is of interest. For example, a two-dimensional detector array, such as a charge-coupled device, enabling separate read-out of both spectra can be used.

What is claimed is:

1. An optical spectrometer, comprising:
   an entry opening for receiving incoming light;
   a grating;
   a first light path and a second light path along each of which the incoming light is incident on the grating, at least a part of the second light path not coinciding with the first light path, a component of the incoming light that has been selected on the basis of its polarization properties passing along at least a part of the second light path;
   at least one polarization rotation element in the path of at least a part of the second light path for rotating a polarization direction of the selected component of the incoming light so that the incoming light reaches the grating with its direction of maximum polarization substantially along a main direction of polarization which is diffracted with maximum efficiency by the grating.

2. The optical spectrometer of claim 1, further comprising:
   a first polarization component of the incoming light being diffracted after reaching the grating substantially only along the first light path; and
   a second polarization component of the incoming light being diffracted after reaching the grating via the second light path, the at least one polarization rotation element being arranged to rotate the polarization direction of light from the second polarization component so that the second polarization component reaches the grating rotated orthogonally relative to the first polarization component.

3. The optical spectrometer of claim 2, wherein the second light path contains the first light path followed by a sub-path along which light is specularly reflected from the grating undiffracted, the spectrometer containing a reflecting element for reflecting the reflected light from the sub-path back onto the grating, the polarization rotation element being arranged to rotate the polarization directions of the reflected light substantially orthogonally between reflection from the grating and reaching back to the grating.

4. The optical spectrometer of claim 2, further comprising a polarization-sensitive splitting element, the first light path containing a first output of the splitting element for the first polarization component, the second light path running from a second output of the splitting element to the grating, the second light path and a part of the first light path that runs from the splitting element to the grating differing from one another with respect to the amount of rotation of polarization introduced by the at least one polarization rotation element so that both the first polarization component and the second polarization component reach the grating with their direction of polarization parallel to the main direction.

5. The optical spectrometer of claim 2, further comprising a detector for detecting light diffracted by the grating, wherein the first light path and the second light path are configured so that the spectrometer images each wavelength component of the first polarization component of the incoming light onto the detector at substantially the same position where the spectrometer images a corresponding wavelength component of the second polarization component of the incoming light.

6. The optical spectrometer of claim 2, further comprising a detector for detecting light diffracted by the grating, wherein the first light path and the second light path are configured such that, after diffraction from the grating, the spectrometer images the wavelength components of the first polarization component of the incoming light at a detectably different series of positions than further positions where the spectrometer images the wavelength components of the second polarization component of the incoming light.

7. The optical spectrometer of claim 6, containing a polarization filter optically between the grating and the detector, the filter being oriented to block out a component of the diffracted light with a direction of polarization perpendicular to the main direction.

8. The optical spectrometer of claim 1, further comprising a detector for detecting light diffracted by the grating, configured so that first-order diffraction occurs in a direction substantially perpendicular to the plane of the grating for a wavelength range of interest, the detector being located to receive light diffracted in a range of directions including or abutting to the perpendicular direction.

9. The optical spectrometer of claim 1, wherein the incoming light is incident on the grating under a grazing angle when the incoming light is diffracted.

10. The optical spectrometer of claim 1, wherein the period of the grating and an angle of incidence of the light on the grating have values selected so that substantially no wavelength-dependent diffraction other than first-order diffraction from the grating is possible in a wavelength region of interest.

11. The optical spectrometer of claim 1, wherein the grating is of a type wherein, in the main direction, an electric field vector of light incident on the grating is substantially perpendicular to the lines of the grating.

12. A method of spectrally analyzing light, the method comprising:
    receiving incoming light;
    using a grating to diffract the incoming light, the grating having a main direction that diffracts polarized light with maximal efficiency when its polarization direction is in parallel with the main direction;
    splitting off at least a part of the incoming light from a remaining part of the incoming light so that a first polarization component of the incoming light is split off with higher efficiency than a second polarization component of the incoming light;
    feeding the split-off part to the grating so that a direction of the first polarization component in the split-off part is in parallel with the main direction at least once when the split-off part is diffracted by the grating; and
    feeding the remaining part of the incoming light to the grating so that a direction of the second polarization component in the remaining part is in parallel with the main direction at least once when the remaining part is diffracted by the grating.

13. The method according to claim 12, wherein said splitting off is performed by guiding the incoming light to the grating and receiving the split-off part in a direction of specular reflection from the grating, the split-off part being fed back to the grating for diffraction along a path which contains a polarization rotation element, the polarization rotation element rotating the polarization of the split-off part orthogonally in the path.

14. The method according to claim 13, wherein the split-off part is reflected back onto the grating folded back over the path from the grating so that the split-off part passes back and forth though the polarization rotation element, the polarization rotation element rotating the polarization of the split-off part during passage back and forth each time over half the orthogonal rotation.

15. The method according to claim 12, wherein splitting off is performed with a polarization splitting element before the incoming light reaches the grating, the split-off part and the remaining part being guided to the grating via a first path and second path, respectively, at least the first path containing a polarization rotation element to rotate the polarization of the split-off part orthogonally relative to the remaining part.

* * * * *

UNITED STATES PATENT AND TRADEMARK OFFICE
CERTIFICATE OF CORRECTION

PATENT NO.        : 6,970,242 B2
APPLICATION NO.   : 11/034229
DATED             : November 29, 2005
INVENTOR(S)       : Gerwin Jan Puppels It is certified that error appears in the above-identified patent and that said Letters Patent is hereby corrected as shown below:

In the specification:

| | | |
|---|---|---|
| COLUMN 1, | LINES 9, 10, | change "WO 2204/008089" to --WO 2004/008089-- |
| COLUMN 1, | LINE 55, | change "others" to --other-- |
| COLUMN 8, | LINE 47, | change "may directed" to --may be directed-- |
| COLUMN 9, | LINE 20, | change "beam of light 6" to --beam of light 1-- |

Signed and Sealed this

Twenty-ninth Day of June, 2010

David J. Kappos
*Director of the United States Patent and Trademark Office*